(12) United States Patent
Ward et al.

(10) Patent No.: US 9,047,162 B2
(45) Date of Patent: Jun. 2, 2015

(54) DYNAMIC SOFTWARE VERSION SELECTION

(71) Applicant: International Business Machines Corporation, Armonk, NY (US)

(72) Inventors: David G. Ward, Grafton, MA (US); Simon J. Webb, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/045,148

(22) Filed: Oct. 3, 2013

(65) Prior Publication Data

US 2014/0033191 A1  Jan. 30, 2014

Related U.S. Application Data

(63) Continuation of application No. 12/982,970, filed on Dec. 31, 2010, now Pat. No. 8,595,715.

(51) Int. Cl.
*G06F 9/44* (2006.01)
*G06F 9/445* (2006.01)

(52) U.S. Cl.
CPC .. *G06F 8/65* (2013.01); *G06F 8/71* (2013.01); *G06F 9/44521* (2013.01); *G06F 9/44536* (2013.01)

(58) Field of Classification Search
CPC .... G06F 8/71; G06F 9/44521; G06F 9/44536
See application file for complete search history.

(56) References Cited

U.S. PATENT DOCUMENTS

| 5,634,114 | A  | * | 5/1997 | Shipley | 717/170 |
|---|---|---|---|---|---|
| 6,154,878 | A  | * | 11/2000 | Saboff | 717/173 |
| 6,185,734 | B1 | | 2/2001 | Saboff et al. | |
| 6,199,203 | B1 | * | 3/2001 | Saboff | 717/168 |
| 7,155,462 | B1 | | 12/2006 | Singh et al. | |
| 7,155,712 | B2 | * | 12/2006 | Takimoto | 717/170 |
| 7,370,316 | B2 | | 5/2008 | Kraiss et al. | |
| 7,487,536 | B2 | | 2/2009 | Sakurai et al. | |

(Continued)

OTHER PUBLICATIONS

Michael L. Creech et al.; Using hypertext in selecting reusable software components; 1991 ACM; pp. 25-38; <http://dl.acm.org/citation.cfm?id=122978>.*

(Continued)

*Primary Examiner* — Thuy Dao
*Assistant Examiner* — Cuong V Luu
(74) *Attorney, Agent, or Firm* — Thomas E. Lees, LLC

(57) ABSTRACT

Dynamic software version selection is performed by executing a software component on a processing device having a binding library associated with a software component, where the binding library comprising a loader component and a binding component. The loader component serves as an intermediary between the software component and the binding component and the binding component comprises software component-side logic. The binding library is utilized to interface the software component with a remote server across a network environment. In response to a request to update to a different version of the library, the loader component selects a desired version of the library. The desired version of the library is loaded into memory of the processing device by logically disconnecting from the remote server, unloading a previously loaded library, loading the updated version of the library, and reconnecting to the remote server.

20 Claims, 6 Drawing Sheets

(56) References Cited

U.S. PATENT DOCUMENTS

| | | | |
|---|---|---|---|
| 7,539,985 | B2 | 5/2009 | Marvin |
| 7,676,448 | B2 | 3/2010 | Henderson et al. |
| 7,689,985 | B2 | 3/2010 | Callender |
| 8,006,240 | B2 | 8/2011 | Bhatkhande et al. |
| 8,776,036 | B2 * | 7/2014 | Das ................. 717/163 |
| 2004/0230967 | A1 | 11/2004 | Yuknewicz et al. |
| 2006/0200817 | A1 * | 9/2006 | Callender ............ 717/170 |
| 2007/0050757 | A1 | 3/2007 | van Woerkom et al. |
| 2007/0169103 | A1 * | 7/2007 | Bhatkhande et al. ...... 717/170 |
| 2007/0204263 | A1 | 8/2007 | Nathan et al. |
| 2007/0220496 | A1 | 9/2007 | Kasama |
| 2007/0220502 | A1 | 9/2007 | Asselin et al. |
| 2009/0037933 | A1 * | 2/2009 | Chandran et al. ......... 719/315 |
| 2009/0241101 | A1 | 9/2009 | Won-Young et al. |
| 2010/0023955 | A1 | 1/2010 | Verbist |
| 2010/0088281 | A1 | 4/2010 | Driesen et al. |
| 2010/0313079 | A1 * | 12/2010 | Beretta et al. .......... 714/48 |
| 2011/0078676 | A1 * | 3/2011 | Sutherland et al. ....... 717/173 |

OTHER PUBLICATIONS

M. L. Griss; Software reuse from library to factory; 1993 IBM; pp. 548-566; <http://ieeexplore.ieee.org/stamp/stamp.jsp?tp=&arnumber=5387334>.*

Eduardo Ostertag et al.; Computing similarity in a reuse library system an AI-based approach; 1992 ACM; pp. 205-228; <http://dl.acm.org/citation.cfm?id=131739>.*

Yoelle S. Maarek; An Information Retrieval Approach for Automatically Constructing Software Libraries; 1991 IEEE; pp. 800-813; <http://ieeexplore.ieee.org/stamp/stamp.jsp?tp=&arnumber=83915>.*

Ian H. Witten; Greenstone a comprehensive open-source digital library software system; 2000 ACM; pp. 113-121; <http://dl.acm.org/citation.cfm?id=336650>.*

A.J. Ramirez-Cuesta; aCLIMAX 4.0.1 The new version of the software for analyzing and interpreting INS spectra; 2003 ISIS facility; pp. 226-238; <http://www.sciencedirect.com/science/article/pii/S00104655503005204#>.*

Tien N. Nguyen; "Component-Based Software Update Process in Collaborative Software Development", 2008 15th Asia-Pacific Software Engineering Conference, 2008.

Bernhard Westfechtel, Bjorn Munch and Reidar Conradi; "A Layered Architecture for Uniform Version Management", 2001 IEEE.

Jiang Zheng, Laurie Williams, Brian Robinson and Karen Smiley; "Regression Test Selection for Black-box Dynamic Link Library Components", Department of Computer Science, North Carolina State University, Raleigh, NC and ABB Inc., US Corporate Research, 2007.

Thomas Zimmermann et al.; "Mining Version Histories to Guide Software Changes"; 2005 IEEE; vol. 31, Issue No. 6, pp. 429-445; <http://ieeexplore.ieee.org/stamp/stamp.jsp?tp=&arnumber=1463228.

Ian H. Witten et al.; "Greenstone: A Comprehensive Open-Source Digital Library Software System"; 2000 ACM; pp. 113-121; <http://dl.acm.org/citation.cfm?id=336650>.

Ruben Prieto-Diaz; "Classifying Software for Reusability"; 1987 1EEE; vol. 4, Issue No. 1, pp. 6-16; <http://ieeexplore.ieee.org/stamp/stamp.jsp?tp=&arnumber=1695670>.

M. L. Griss; "Software reuse: From library to factory"; 1993 IBM Systems Journal, vol. 32, Issue No. 4, pp. 548-566; <http://ieeexplore.ieee.org/stamp/stamp.jsp?tp=&arnumber=5387334>.

Martin Boldt et al.; "Software Vulnerability Assessment Version Extraction and Verification"; 2007 IEEE; 6 pages; <http://ieeexplore.ieee.org/stamp/stamp.jsp?tp=&arnumber=4299939>.

Yongbeom Kim et al.; "Software Reuse: Issues and Research Directions"; 1992 IEEE; pp. 612-623; <http://ieeexplore.ieee.org/stamp/stamp.jsp?tp=&arnumber=183360>.

Chinese Office Action dated Feb. 24, 2014 for Chinese patent application No. 201110359976.4, filed Nov. 14, 2011, see in particular page ten.

* cited by examiner

DYNAMIC SOFTWARE VERSION SELECTION

CROSS-REFERENCE TO RELATED APPLICATIONS

This application is a continuation of U.S. patent application Ser. No. 12/982,970, filed Dec. 31, 2010, entitled "DYNAMIC SOFTWARE VERSION SELECTION", now patented as U.S. Pat. No. 8,595,715, the disclosure of which is incorporated herein by reference.

BACKGROUND

Various aspects of the present invention relate generally to software version selection, and in particular, to the dynamic selection of a of software version with minimal or no interruption to the supported process or service during a version change.

Middleware allows multiple processes running on one or more machines to interact. Accordingly, middleware is useful in supporting complex distributed applications, such as transaction systems and messaging-and-queuing systems. As an example, middleware in the form of an Online Transaction Processing (OLTP) system is often used to support key business processes and services. For instance, an online transaction processing system may be utilized to facilitate and manage transaction-oriented applications that capture new data, update existing data, handle data entry and retrieval, etc., within an order-entry system. As another example, middleware in the form of a message queuing system may be utilized to facilitate program to program communication by writing and retrieving application specific messages to and from queues, without necessarily requiring a dedicated logical connection between communicating programs.

Middleware, including modern OLTP systems, message and queuing systems, etc., typically support transactions that span a network and may cross one or more domains controlled by different entities. As such, middleware applications, such as OLTP applications and message and queuing applications, are typically implemented using client/server processing and brokering that allow transactions to run on different computer platforms within a network. Accordingly, software upgrades to such middleware systems usually drive a requirement that the applications are shut down, taking associated applications off-line to allow software installation and configuration where necessary.

BRIEF SUMMARY

According to aspects of the present disclosure, dynamic software version selection is performed by executing a software component on a processing device. Dynamic software version selection is further performed by associating a binding library with the software component, where the binding library comprising a loader component and a binding component. Here, the loader component serves as an intermediary between the software component and the binding component and the binding component comprises software component-side logic. Dynamic version selection is further performed by utilizing the binding library to interface the software component with a remote server through communication across a network environment, and by providing a request to the loader component to update memory of the processing device with a new version of a library of the binding component. Dynamic software version selection is still further performed by selecting, by the loader component, in response to the request, a desired version of the library where the desired version of the library is selected from at least two versions of the library associated with the binding component of the binding library. Also, dynamic software version selection is performed by loading the desired version of the library into memory of the processing device. Loading is performed by logically disconnecting from the remote server, unloading a previously loaded library, loading the updated version of the library, and reconnecting to the remote server.

DETAILED DESCRIPTION

Figure 1:
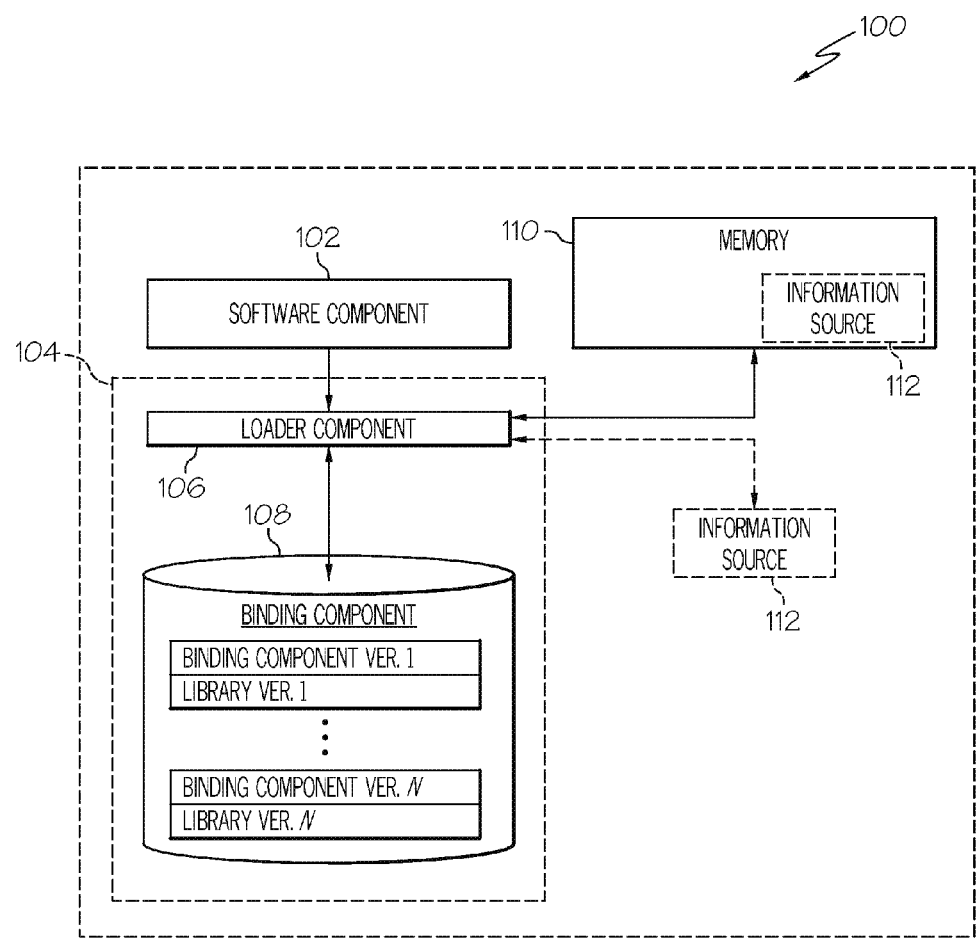
FIG. 1 is a schematic illustration of a system for implementing dynamic software version selection according to aspects of the present invention.

Various aspects of the present invention provide techniques that enable a software system to be modified with new software, without shutting the software system down or without otherwise providing service interruption. Software modifications include for example, the implementation of software upgrades, reversion back to an earlier software version, reloading of a software version, repair or patching of a software version, etc. Accordingly, software systems are provided, which can, without interruption, be upgraded with new software, e.g., containing fixes to known problems and/or new features, and whose parts may be using different versions, e.g., service levels, of software, etc. Software systems can also be retro-graded to an earlier version. Moreover, both client-side and server-side systems can be modified with new software.

Further, various aspects of the present invention described herein provide for managing versioned implementations at an application programming interface (API)-boundary within a continuously-running process such that no process restart is required for the associated software code. The ability to implement an update without restarting the process can be carried out even where the process is a third party application, e.g., a customer application, which is not under the control of an update mechanism provided to carry out the software modification. Thus, run-time updating and modification of native code libraries are readily implemented. Also, the update mechanism can implement dynamic internal state handling to enable functional library version changeover underneath a running process, e.g., in systems that utilize dynamic linked libraries.

Still further, aspects of the present invention provide an update mechanism that facilitates the ability to make and control migration decisions, such as how and when to upgrade, downgrade or otherwise replace software code, which may be stored in libraries. Accordingly, the update mechanism can exhibit dynamic behavior that provides flexibility in software version modification processes and decisions. Moreover, the update mechanism can implement selective software versioning, e.g., on a program by program basis, or based upon other selection criteria.

According to still further aspects of the present invention, the update mechanism may comprise a binding library, which is associated with a software component (calling component). In this manner, the calling component calls the binding library from time to time to implement application programming interface (API) calls. The binding library is implemented as a loader component and a binding component. The loader component serves as an intermediary to receive calls from the software component and to issue equivalent API calls to the binding component. The binding component comprises software component-side logic, including at least two versions of a library. Each library version includes logic for responding to application programming interface calls from the calling component.

The loader component recognizes or otherwise detects a trigger, and in response thereto, implements decision logic. The decision logic may check for the presence of a new library version, detect a desired version of the library that should be loaded, direct the loader component to select and load a desired version of the library from the binding component into memory of a processing device, etc. If a version of the library loaded into memory is replaced, the unloading of the old library version and loading of the new library version is performed without requiring that the associated software component restart.

For instance, in a first illustrative example, only select API calls, e.g., connect/disconnect (or analogous) API's, have decision logic to cause a library version reload. Thus, the loader component may be triggered to check the version of a library loaded into memory, and to update the version if necessary, in response to receiving the specific command or commands, e.g., connect and disconnect API calls, from the associated software component. As will be described in greater detail herein, in this illustrative example, no state migration is needed to implement the library version reload.

As another illustrative example, all API calls to the loader component have decision logic. As such, the loader component is triggered to check the version of a library loaded into memory, and to update the version if necessary, in response to receiving any API call from the associated software component. In this illustrative example, state migration should be supported, as will be described in greater detail herein. Still further, regardless of whether select API calls or all API calls have decision logic to trigger library version checking, the loader component may support program level or program specific controls that allow control over which programs will migrate library versions, and which will not, in response to received API calls.

Dynamic Software Version Selection

Referring now to the drawings, and in particular, to FIG. 1, a schematic of a system 100 is illustrated, which is suitable for implementing dynamic software version selection, according to aspects of the present invention. The system 100 may be implemented on a single physical processing device. Alternatively, the system 100 can be distributed across multiple physical processing devices that are communicably connected together, such as by a network. In this regard, each processing device may comprise hardware and/or software processing components for carrying out aspects of the invention as described in greater detail herein.

As illustrated, the system 100 comprises at least one software component 102 and an associated binding library 104. The software component 102 may comprise for example, any software that invokes the services of another component, e.g., the associated binding library 104. The software component 102 may be implemented for example, as a software application, program, object, service, agent, operating system, etc. In this regard, the software component 102 may also be referred to herein as a calling component 102.

The binding library 104 is implemented in two components, including a loader component 106 and a binding component 108. The loader component 106 interacts with the software component(s) 102 and the binding component 108 to load the correct version of an associated library of the binding component into memory 110. The loader component 106 may also optionally interact with one or more optional information sources 112, which may be provided for assistance in carrying out version management. For instance, as will be described in greater detail herein, an information source 112 may be implemented as a table, either stored in the memory 110, or as a separate file, which indicates a current version of the associated library maintained by the binding component 108.

The binding component 108 comprises one or more versions of a library, which contains software component-side logic, including at least two versions of a library. Each library version includes logic for responding to application programming interface (API) calls from the calling component 102. As used herein, the term "library" is intended to be general and non-limiting. For instance, the "library" versions may each comprise any relevant packaging unit for software, e.g., a jar file, program, module, dynamic linked library, etc. Moreover, each library version is not limited to a native code library and can thus be used with implementations such Java.

The loader component 106 serves as an intermediary between the software component 102 and the binding component 108 of the binding library 104. In this regard, the loader component 106 may be the only component that is statically linked with the software component(s) 102. According to aspects of the present invention, the loader component 106 may be implemented as a library itself In this exemplary implementation, the loader component 106 functions primarily a forwarding library. That is, most of the time, the loader component 106 accepts API calls from the software component 102 and in response thereto, calls the equivalent API in the currently loaded library version associated with the binding library 108.

According to further aspects of the present invention, decision logic may be inserted into the execution path of the forwarding functions from the loader component 106 to the appropriate library of the binding component 108. The choice of which forwarding functions should have decision logic and those that should not, depends on the specific implementation, examples of which are described in greater detail below.

The binding component 108 comprises one or more versions of a library. For example, as illustrated, the binding component 108 comprises 'N' versions of a library, where N can represent any number of library versions. Each library version may comprise, for example, a dynamic link library that provides software component-side logic for use by the software component 102 for carrying out a particular operations or functions, e.g., for carrying out API calls associated with a middleware process. For instance, the binding component 108 may comprise logic that implements or otherwise responds to API calls from the software component 102.

Figure 3:
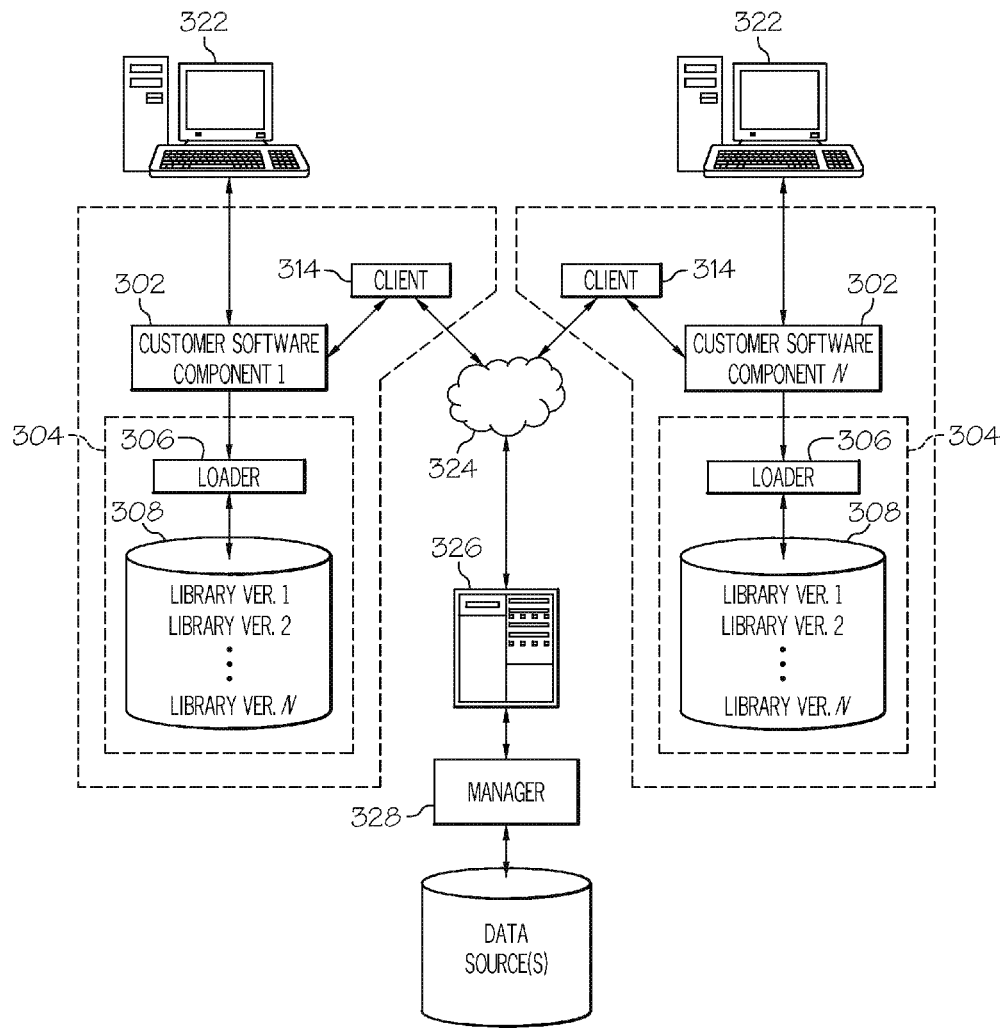
FIG. 3 is a schematic illustration of a system for implementing dynamic software version selection in the exemplary context of a messaging system environment, according to aspects of the present invention.

As noted in greater detail above, the binding component 108 can be implemented in various forms. As illustrated, a file system stores a plurality of binding component versions, each binding component version having an associated library. In another exemplary implementation, such as where all necessary programs and code are encapsulated with a library, the binding component 108 may comprise a file system library that stores each of the library versions, an example, of which is illustrated in FIG. 3. Other binding component configurations may alternatively be implemented.

The loader component 106 does not contain any of the logic needed to support calls by the software component 102. Rather, the loader component 106 dynamically loads the correct version of a library associated with the binding component 108 of the binding library 104, into memory 110 of a corresponding computer processing system. The process of loading the library is effected without requiring the associated software component program to restart. Once the appropriate library has been selected and loaded into memory 110, the loader component 106 receives calls from the software component 102 and forwards equivalent calls from the software component 102 to the appropriate logic loaded from the library into memory 110. Thus, the loader component 106 intercepts and mediates calls from the software component 102. Once a library has been loaded into memory 110, the loader component 106 occasionally checks for the presence of new binding library versions (or instructions to revert to an existing but different binding library version). If the loader component 106 detects the need to change the library version loaded into memory 110, the change is implemented without requiring the underlying software component 102 to be restarted.

In an illustrative implementation, based upon a condition, such as when the loader component 106 notices that the currently loaded or otherwise used library version of the binding component 108 is at an earlier level than the latest available binding component 108, the loader component 106 can dynamically unload the current version of the library loaded into memory and dynamically load the latest version of the library from the binding component 108 into memory. The loading component 106 can also optionally call migration logic, e.g., which may be provided in the newly selected library version, to re-arrange any internal data structures to conform to the requirements of the new library version, if necessary. Thus, internal state migration is automatically and dynamically managed by the binding library 104. Once the new version of the library is loaded into memory and internal state data structures have been migrated (as necessary), the loader component 106 can complete the processing of the current call from the software component 102 (if a call had been made) using the new library.

As will be described in greater detail herein, the loader component 106 may utilize a resource such as one or more information sources(s) 112 in order to select the appropriate version of the library from the binding component 108 to load. In this regard, the information source 112 may comprise a file system symbolic link (e.g., on Unix-like file systems, etc.), a control file, one or more tables or databases (saved as a file or loaded into memory 110), a pointer, or other source to identify the desired library from the binding component 108.

According to still further aspects of the present invention, a common control feature, e.g., a manager function, administrator function, supervisor function, etc., can oversee or supervise software version control. For instance, a manager can direct (e.g., via the loader component 106), that all connected software components 102 to use a desired library version the next time that application makes a call to the loader component 106. A manager can also update the binder component 108 with new library versions from time to time. Thus, the binding library 104 implements an update mechanism, either alone or in combination with one or more additional processes, e.g., manager or supervisory logic etc.

The techniques described herein can be driven by rules or other processes that allow the dynamic upgrade/downgrade of the binding software via the library versions within the binding component 108. Moreover, dynamic upgrade/downgrade of the binding software may occur for only a subset of customer application programs, may occur for specific applications, or may occur at certain time and date, etc.

Figure 2:
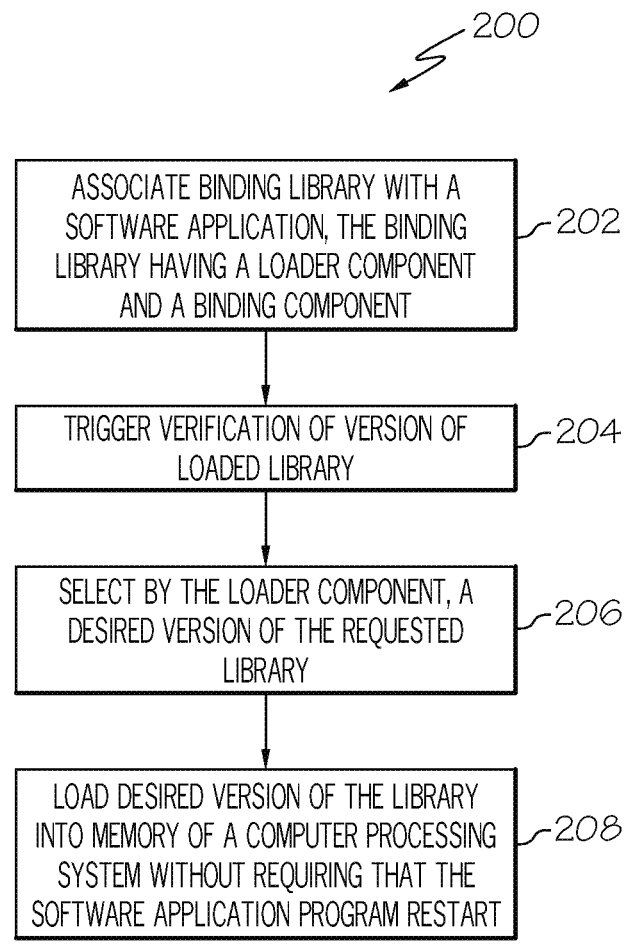
FIG. 2 is a flow chart illustrating an exemplary approach for implementing dynamic software version selection according to aspects of the present invention.

Referring to FIG. 2, a flow chart illustrates the overall flow of a process 200 of performing dynamic software version selection, according to various aspects of the invention. The process 200 may be implemented as a method or as part of a system that includes a combination of hardware and software. For instance, software may be stored in a physical memory device such that when the software is processed by at least one processor, the software causes the corresponding physical machine to implement the actions specified by the illustrated process 200. Thus, for example, the process 200 may be implemented on the system 100 illustrated and described with reference to FIG. 1. Still further, the process 200 may be implemented as a computer program product comprising a tangible computer readable storage medium having computer readable program code embodied therewith.

The process 200 comprises associating a binding library with a software component at 202. The binding library comprises a loader component and a binding component, where the loader component serves as an intermediary between the software component and the binding component and the binding component comprises software component-side logic. According to certain aspects of the present invention, it is the job of the loader component to "recognize" or "decide" that a binding library reload is required. In this regard, the loader component recognizes that a different binding library must be loaded.

The process 200 further comprises triggering a verification of the version of the loaded library at 204 by the loader component. For instance, the loader component may execute decision logic to decide, e.g., based upon rules, conditions, or other information, whether the currently loaded library should be modified, e.g., upgraded to a new version or retrograded to an earlier version. The trigger may be implemented by receiving specific API calls associated with decision logic to trigger the verification of the library version. As another illustrative example, all API calls received by the loader component may have the decision logic associated therewith. If no library is loaded, the loader component may utilize the same rules, conditions, or other information to select a library version to load into memory.

If there is no need to modify a version of the library loaded into memory, then the process 200 is complete. Otherwise, the process 200 further comprises selecting at 206, by the loader component, a desired version of the requested library. The desired version of the library may be selected from at least two versions of the library associated with the binding component of the binding library. The desired version of the requested library may be selected, for example, using a file, such as a file system symbolic link, a control file that directs the selection, etc. As an alternative example, the loader component may consult a table or other information source to ascertain the identification of the desired version to be loaded into memory. For instance, the process, e.g., via the loader component, may utilize a library version table to identify versions of the library. As such, the process 200 may store a library version variable that tracks the current version of the library, which can be accessed and utilized by the loader component. Thus, for example, the loader component may read the value of the library version variable and select the desired version of the library based upon the value of the library version variable.

The process 200 still further comprises loading the desired version of the library into memory of a computer processing system without requiring that the associated software component restart. Once a library version has been selected and loaded into memory, the process may further comprise receiving by the loader component, software application program interface calls from the software component and forwarding the received calls to corresponding software application programming interfaces of the desired version of the library loaded into memory.

Dynamic Version Control in a Middleware Environment

Various aspects of the present invention facilitate dynamic version control in an environment such as a middleware environment, by bringing new dynamic linked libraries into a middleware system without downtime or service interruption. Such implementations further provide for the management of versioning in a middleware environment.

Referring to FIG. 3, a schematic is illustrated, of a system 300 for implementing dynamic software version selection. The system 300 implements aspects of the present invention which are, in many ways, analogous to that set out with regard to the system 100 of FIG. 1. However, the system 300 is illustrated in the exemplary context of a messaging system environment to illustrate certain features, according to further aspects of the present invention.

The system 300 includes a plurality of software components 302, which are implemented as customer applications. Each software component 302 is associated with a binding library 304 comprising a loader component 306 and a binding component 308. The binding component 308 contains all of the software component-side logic needed to process messaging and queuing system application programming interface calls. In general, the binding library 304, including the loader component 306 and the binding component 308, are analogous to like named components described with reference to FIG. 1.

The illustrative system 300 can integrate a message and queuing system such as an MQSeries middleware system for messaging and queuing by International Business Machines, of Armonk New York. Using such an arrangement, the various software components 302 can communicate with each other by writing and retrieving application-specific data (messages) to/from queues, without having a private, dedicated, logical connection to link the applications. In this regard, each binding library 304 may contain, for example, a set of executables that implement a client 314 for communicating using the messaging and queuing system.

The system 300 further includes a plurality of client processing devices 322 that communicates across a network 324 with a server computer 326 during the course of executing their associated customer software components 302. A typical physical processing device may include for example: a server computer, a personal computer, a notebook computer, a netbook computer, a tablet computer, a transactional system, a purpose-driven appliance, a pervasive computing device such as a personal data assistant (PDA), a palm computer, a cellular access processing device, a smart phone or any other device capable of executing computer code, etc.

The network 324 provides communications links between the various processing devices 322 and the server 326, and may be supported by networking components including, for example, routers, hubs, firewalls, network interfaces, wired or wireless communications links and corresponding interconnections, cellular stations and corresponding cellular conversion technologies, e.g., to convert between cellular and tcp/ip, etc. Moreover, the network 304 may comprise connections using one or more intranets, extranets, local area networks (LAN), wide area networks (WAN), wireless networks (WIFI), the Internet, including the world wide web, and/or other arrangements for enabling communication between the processing devices 322 and the server computer 326, in either real time or otherwise, e.g., via time shifting, batch processing, etc.

The server computer 326 may be utilized, for example, to execute a queue manager 328, which may be embodied as a set of long-running service processes. The queue manager 328 defines the runtime application that manages sending and queuing messages for each of the customer software components 302. In this illustrative example, the messaging and queuing system is implemented in a client/server configuration. Alternatively, an instance of the queue manager 328 could be implemented as a long running process on each processing device 322.

In general terms, the customer software components 302 use API calls to communicate via their associated client 314 with the queue manager 328, e.g., to send messages to queues associated with other customer applications or to retrieve messages from an associated queue, which have been deposited by other software components 302. Thus, the queue manager 328 interacts with potentially many different customer software components 302 associated with different client processing devices 322, accessing those service processes, each using a product-specific binding library 304. Such an arrangement may occur regardless of whether the queue manager is remote, e.g., on a server computer 326 as part of a client/server implementation, or co-located with the binding library 304 in a local configuration of a corresponding processing devices 322.

From time to time, it is desirable to update software of the various components operating within the system 300. Assume that the messaging and queuing system needs to perform an update. According to various aspects of the present invention, new versions of the message and queuing system software can be dynamically deployed without service interruption. Such software modifications include changes to software that is bound with each customer software component 302, e.g., the associated version of a library loaded by an associated instance of the binding library 304. Software modifications further comprise changes to the internal processes of the messaging and queuing system, e.g., changes to the queue manager 328, changes, additions or deletions to library versions stored associated with the binding component 308, etc.

In the case of modifications to software internal to the messaging and queuing system, such internal processes can be designed to be re-startable when, or soon after, a software upgrade becomes available. To the contrary, customer software components 302 have process lifecycle requirements that are determined by customer business requirements and are under customer control, not control of the messaging and queuing system.

In general, the service processes associated with the queue manager 328 can be implemented as conventional operating system processes. Examples in a MQSeries queue manager are the Message Channel Agents (MCA), which as used to read and write messages over the network to other MCAs, and Local Queue Manager Agents (LQMA), which form the basic queuing engines. These processes are managed, in the sense that the queue manager 328 itself maintains a pool of available MCA and LQMA processes that are reused as needed. Idle instances of both the MCA and LQMA processes are reused as new work arrives. When new software, e.g., in the form of either new libraries or programs, is installed in the file system, the queue manager can shutdown any idle instances of these programs and start new processes. The processes will, without any other help, use the new software. Similarly, software downgrades are also possible by reversing the file system changes that installed the new software files.

Customer software components 302 obtain access to the messaging and queuing system services using the binding library 304, e.g., a library named "libmqm" in the case of MQSeries. The binding library 304, in one regard, presents a fixed and well-defined interface to the application 304. Moreover, the binding library 304 interfaces with the internals of the queue manager 328.

Customer software components 302 cannot, in general, be forced to restart even though new software is available. For instance, in general, a process on the server computer 326 cannot force a restart of a software component 302 on a remote processing device 322. However, in the illustrative example, both a current set of program/library executables and a new set of program/library executables are available together in each file system as illustrated by each binding component 308 comprising a plurality of different library versions. In this regard, software executed by each software component 302 associated with the messaging and queuing system, e.g., the client 314, etc., can be updated in a manner analogous to that described with reference to FIG. 1 and FIG. 2.

To allow new versions of the binding library to be deployed without requiring customers to restart their software components 302, each binding library 304 is divided into two different components, including a loader component 306 and a binding library 308, in a manner analogous to the loader component 106 and binding component 108 described with reference to FIG. 1. The loader component 306 may be implemented, for example, as a small library. However, the loader component 306 does not contain any of the logic needed to support application programming interfaces of messaging and queuing system. Rather, the loader component 306 loads the correct version of the binding library into memory on the corresponding client processing device 322. The loader component 306 then forwards equivalent API calls from the application program to the appropriate interfaces in the loaded library, e.g., the client 314, to implement sending messages to message queues, retrieving messages from message queues or otherwise interacting with the messaging and queuing system.

Once the loader component 306 has selected and loaded a library from the binding component 308, the loader component 306 forwards equivalent versions of all API calls from the software component 302 to the loaded library from the binding component 308. The loader component 306 thus effectively intercepts and mediates all API calls between the customer software components 302 and the library loaded from the binding component 308, which are associated with the messaging and queuing system.

To perform a software modification to the library on a customer processing device 322, the server 326 or any other source provides a new version of the corresponding library to the binding component 308. The binding component 308 stores the library in such a way that each version of the library can be uniquely identified by the corresponding loader components 306. Further, the loader component 306 may be provided with information that identifies the version of the library to be loaded, as described more fully herein. However, a running instance of the customer software components 302 may continue to use whatever library version is currently loaded into memory of the associated processing device 322 until an appropriate command is given to cause the loader component 306 to update the memory of the corresponding client computer 322 with the new version of the library.

Upon the timing of a predetermined event, the loader component 306 can unload a previous library version if a previous version was already loaded. Correspondingly, the loader component 306 can load a new version of the library from the binding component 308.

According to an illustrative example, the customer software components 302 may use a designated disconnect and reconnect API sequence to trigger the loading of a new library from the binding component 308. Until the customer software components 302 performs this sequence of application programming interface calls, the customer software components 302 will continue to use the older library version software.

In an illustrative implementation, the software library modification may be triggered by the customer software components 302 issuing disconnect and reconnect API calls to the binding application 304. Thus, the loader component 306 may dynamically unload the current version of the library loaded into memory upon customer application disconnect and subsequently dynamically load a new version of the library upon customer application connect. In the exemplary implementation of MQSeries, loading and unloading of the library from the binding component 308 is implemented in the loader component's MQCONN (MQ series connect) and MQDISC (MQ series disconnect) processing. The commands to load and or unload a library in this illustrative example are implemented by the corresponding customer software components 302, thus enabling the customer application to control the timing of updates.

According to aspects of the present invention, in the above illustrative implementation, only the connect/disconnect forwarding APIs need to have decision logic in them. For connect/disconnect APIs, the decision logic may be executed before the call is forwarded to the corresponding library. As such, if a need arises to modify the currently loaded library version, such a change may be implemented before executing the called API. The other APIs can trigger equivalent API calls from the loader component 306 to the corresponding library version of the associated binding library 308, thus implementing forwarding functions with no decision logic within them. In this case, the loader component 306 only checks for the presence of new binding library versions in these "special" APIs (or similar designated initialization/de-initialization APIs). Other APIs will not trigger the loader component 306 to perform version checking The connect/disconnect APIs are considered 'special' because they setup and teardown the internal state used by the binding library 304 to process the other APIs. As such, there is no need to support the loader component triggered migration of state because the connect/disconnect APIs setup and teardown the state data themselves. Thus, no state migration is needed.

According to yet another illustrative example, all/any APIs (or a subset of APIs) have decision logic to check the library version and to trigger a library modification, if necessary. The decision logic may be executed, for example, before the equivalent call is forwarded to the loaded library version.

Because all (or a subset of) API executions need to run the decision logic, that logic may be efficient, such as by using a memory-based shared library version table that stores an indication of the currently desired library version and/or a list of available library versions. Since the binding library is likely to be carrying internal state data at the time the API is called, the loader component 306 should be able to migrate the binding library state, e.g., using a migration API in the new binding library.

Thus, according to aspects of the present invention, the selection of the version of library from the binding component 308 to be loaded into memory, is taken out of the control of the operating system, and can be placed under direct control of the loader component 306. The loader component 306 can perform whatever validation is needed before loading the library, and can implement more sophisticated loading techniques and strategies than are possible by simply relying on the underlying operating system library loading mechanisms. Moreover, the loader component 306 is capable of performing fallback to an earlier library version software level, e.g., provided the internal state migration is possible and supported by the migration API in the later binding library.

As such, aspects of the present invention contribute to continuous availability by eliminating planned outages for maintenance updates to system software, e.g., middleware in this illustrative example. In this regard, the software capabilities described herein, can allow changes without requiring the system software to be restarted, and even without requiring applications to be quiesced during the changes. Thus, applications can continue using the system software even when the changes affect the application interfaces so that two (or more) different application interfaces can be presented by the same system software during the process of applying the change.

The discussion of dynamically updating software associated with a middleware system, e.g., a messaging and queuing system, is presented by way of illustration and not by way of limitation to illustrate techniques for performing dynamic software modifications without service interruption, as set out more fully herein.

The Library Version Table

Figure 4:
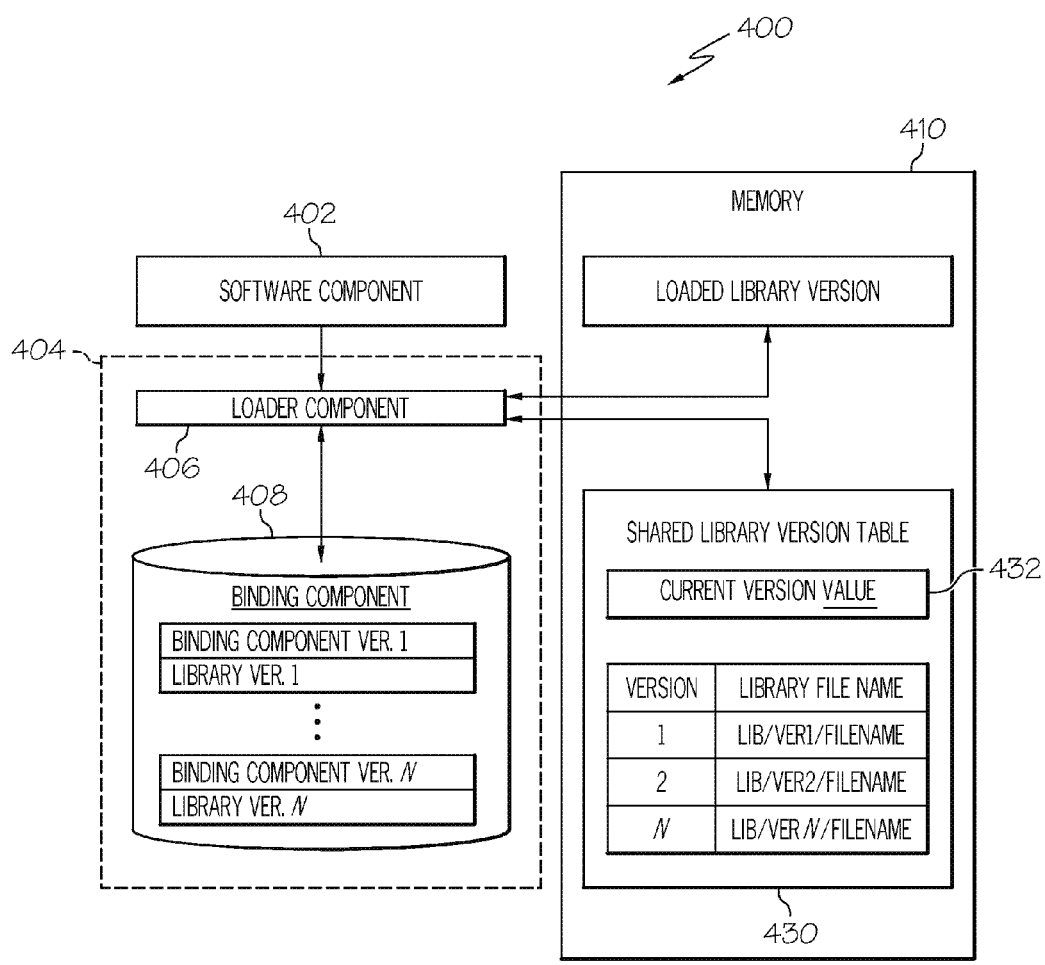
FIG. 4 is a schematic illustration of a system for implementing dynamic software version selection, which uses a shared library version table, according to aspects of the present invention.

Referring to FIG. 4, a schematic is illustrated, of a system 400 for implementing dynamic software version selection. The system 400 includes in general, a software component 402 and an associated binding library 404. The binding library 404 is implemented in two distinct components, including a loader component 406 and a binding component 408. In this regard, the software component 402, binding library 404, loader component 406 and binding component 408 are substantially analogous to like named components described with reference to any one or more of FIGS. 1-3.

According to further aspects of the present invention, the loading and use of new library software can, in general, be triggered when the customer application 402 issues API calls. As discussed in greater detail herein, triggering of version checking and library reloading can occur in response to the loader component 406 receiving special APIs, e.g., connect and disconnect APIs. As yet another illustrative example, the triggering of version checking and library reloading can occur in response to the loader component 406 receiving all APIs from corresponding calling software component(s).

In the illustrated exemplary implementation, the system 400 further comprises a shared library version table 430. The shared library version table stores information related to the various versions of the library stored by the binding component 408. For instance, as illustrated, the library table 430 contains the names and version numbers of all available libraries associated with a corresponding binding component 408. Additionally, the shared table 430 may contain a library version variable 432, which stores an indication of which version of the libraries, e.g., which shared table entry, represents the current version of the library that should be loaded into memory.

The shared table may be populated by any management process, such as the queue manager 328 described with reference to FIG. 3. Moreover, a mechanism may be implemented to publish available library versions, e.g., to the shared library table 430.

Upon a predefined triggering event, e.g., the receipt of a "special" API call associated with corresponding decision logic, upon receipt of all API calls (all API calls associated with appropriate decision logic), or based upon other decision logic, (depending upon the specific implementation), the loader component 406 inspects the shared table 430 to see whether the customer program 402 is using the correct current version of the available libraries. If the software component 402 is not using the correct version of the library, the loader component 406 orchestrates unloading the old library version and loads the correct new version. For instance, the loader component 406 can compare the value stored in the library version variable 432 with the version of the library loaded into memory.

Thus, for example, whenever the customer software component 402 makes an API call associated with corresponding decision logic, the loader component 406 can perform an inspection of available libraries against the library version currently being used. When the loader component 406 notices that the currently loaded library is at a different level than the latest available library, the loader component can dynamically unload the current library and dynamically load the specified library. Optionally, a call to a special migration API in the new library may be implemented, e.g., to re-arrange any internal state data structures to conform to the requirements of the new library (if necessary), and complete the processing of the current API call using the new library.

In certain exemplary implementations, a manager or other supervisory process, e.g., the queue manager described with reference to FIG. 3, can direct all connected customer application programs to use a different, e.g., newer or older version of the library software the next time the application makes an API call. Alternatively, other rules, timing conditions, etc., can dictate when a software version modification is performed.

Program-Specific Library Version Control

Figure 5:
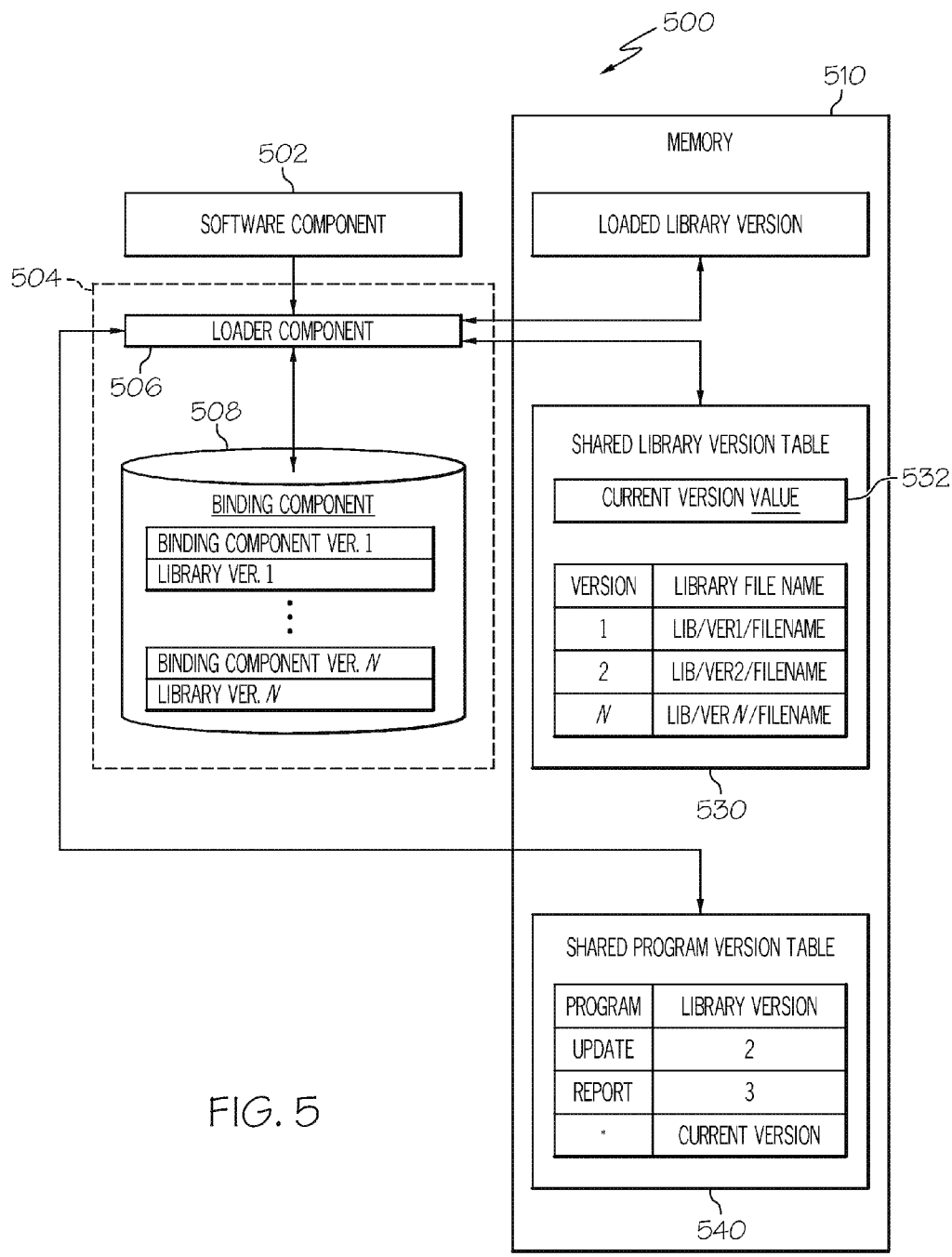
FIG. 5 is a schematic illustration of a system for implementing dynamic software version selection, which uses a shared library version table and a shared program version table, according to aspects of the present invention.

Referring to FIG. 5, a schematic is illustrated, of a system 500 for implementing dynamic software version selection, which extends the dynamic software version selection to support "program-specific" controls that allow some control over which programs will migrate to new/different versions and which should not. The system 500 includes in general, a software component 502 and an associated binding library 504. The binding library 504 is implemented in two distinct components, including a loader component 506 and a binding component 508. In this regard, the software component 502, binding library 504, loader component 506 and binding component 508 are substantially analogous to like named components of described with reference to any one or more of FIGS. 1-4.

In general, all software components 502 may tend to migrate to a designated current version, usually the latest version, of the library as they execute application programming interface calls. However, according to further aspects of the present invention, control is provided, over which programs should migrate to the current version and whether there are certain programs that should not migrate.

As illustrated, FIG. 5 may include a shared library version table 530, which is analogous to the shared library table 430 described with reference to FIG. 4. However, the illustrated implementation further comprises a shared program version table 540. The shared program version table 540 stores a plurality of software components, and the corresponding library version for each application. For instance, as illustrated, a first software program "UPDATE" is configured to utilize library version 2. However, the software program "REPORT" is configured to use library version 3.

Thus, if the software component 502 calling the loader component 506 is the software program UPDATE, the loader component 506 (when triggered by an appropriate API associated with corresponding decision logic) ensures that library version 2 is loaded before processing the call. Correspondingly, if the software component 502 calling the loader component 506 is the program REPORT, the loader component 506 (when triggered by an appropriate API associated with corresponding decision logic) ensures that library version 3 is loaded before processing the call. By centrally controlling the shared program version table 540, a management component can determine when individual programs should begin migrating to a new or different library version.

The program library version table 540 maps program names (or patterns that match program names, etc.) to library versions. The program library version table 540 is populated by a suitable management process, e.g., the queue manager 328 in the example of FIG. 3, or any other suitable supervisory process. Moreover, the program library version table 540 contains the names or name patterns of programs that have specific library versions associated therewith. The loader component 506 locates the calling program's name in the program library version table before making a version upgrade or down-grade decision.

The program-specific decision logic of the loader component 506 can be extended, e.g., to migrate all programs by having a single row that matches all program names, e.g., using a wildcard or other suitable language, that refers to the latest available, or current, library version. The implementation could require that all programs match at least one row in the program library version table, or an implementation could simply default to a predetermined or previous version if the program name doesn't match any row, for example.

Encapsulation

Various aspects of the present invention have been described with reference to software implementations that utilize dynamic loaded libraries. In this regard, software implementations that traditionally utilize programs can be encapsulated into in dynamically loadable libraries rather than in traditional program format. Once encapsulated, various software modification techniques can be utilized as described more fully with reference to FIGS. 1-5 herein. For example, dynamic software version management may be implemented by encapsulating the bulk (or all) of an online transaction processing (OLTP) system for an application into dynamically loadable libraries rather than in programs. When this is done, new OLTP software can be loaded and used without shutting down a program that interacts with the OLTP system. Program functions not related to the OLTP system are not interrupted at all, while program functions related to the OLTP system are upgraded with new software.

Dynamic software library selection for zero-downtime upgrades in client-side environments and many server-side environments can be implemented by embodying OLTP functionality as a set of libraries that are used by the customer business programs or the OLTP system itself. Here, supporting zero-downtime upgrades is accomplished by allowing programs to, at a time of their own choosing, logically disconnect from the OTLP system, dynamically unload the existing OLTP software (libraries), dynamically load the new OLTP software (libraries) and reconnect to the OLTP system using the new software, as described in greater detail herein.

Although strictly speaking, service is interrupted while performing unloading the old library and loading the new library, the interruption is brief and is limited to the particular client process performing the steps. Moreover, the selection of the library/software version to be used is no longer an operating system operation, but is rather, placed under direct control of the OLTP software suite. The OLTP software can perform whatever validation is required, and can implement more sophisticated loading techniques and strategies than are possible by simply relying on the underlying operating system. Additionally, fallback to an earlier software level is also possible using this method.

Exemplary Computer System

Figure 6:
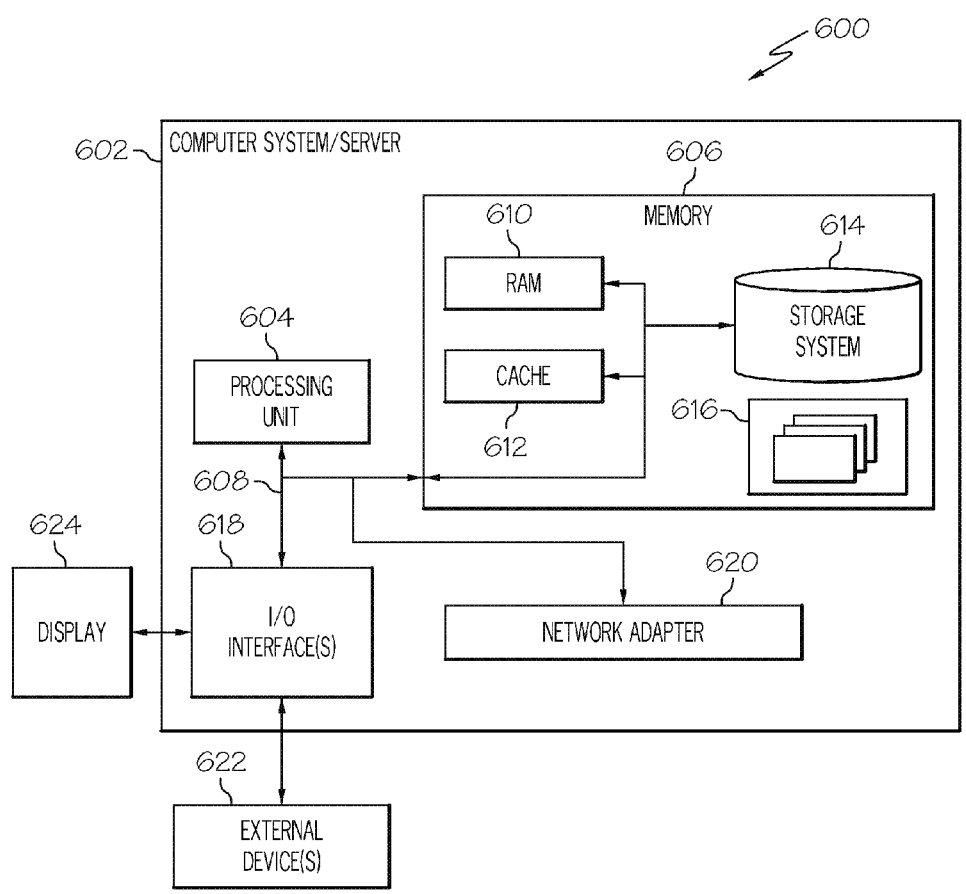
FIG. 6 is a block diagram of a computer system having a computer readable storage medium for implementing functions according to various aspects of the present invention, as described in greater detail herein.

Referring to FIG. 6, a block diagram of a data processing system 600 implemented as a computer system 602, is depicted in accordance with aspects of the present invention. The computer system 602 is operational with numerous general purpose or special purpose computing system environments or configurations. Moreover, the computer system 602 may be described in the general context of computer system executable instructions, such as program modules, being executed by a computer system. Generally, program modules may include routines, programs, objects, components, logic, data structures, and so on that perform particular tasks or implement particular abstract data types.

The components of the computer system 602 may include, but are not limited to, one or more processors or processing units 604, such as a symmetric multiprocessor (SMP) system or other configuration including a plurality of processors connected to the system bus. Alternatively, a single processor may be employed. Components of the computer system 602 further include a system memory 606, and a bus 608 that couples various system components including system memory 606 to the processor(s) 604. The memory 606 can include computer system readable media in the form of volatile memory, such as random access memory (RAM) 610 and/or cache memory 612. The memory 606 may also include other removable/non-removable, volatile/non-volatile computer system storage media, such as a storage system 614, e.g., one or more hard drives. Memory 606 may also include at least one computer readable storage medium 616 having computer readable program code embodied therewith, the computer readable program code comprising computer readable program code configured to carry out the functions of embodiments of the invention described more fully herein.

The computer system 602 may also comprise input/output (I/O) interface(s) 618 and/or a network adapter 620 that communicate with the processor 604 across the bus 608. The computer system 602 may also interface with external devices 622 and/or a display 624. Other hardware and/or software components could be used in conjunction with computer system 602.

The data processing system may comprise, for example, an IBM RS/6000 system, a product of International Business Machines Corporation in Armonk, New York, running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method of performing dynamic software version selection, comprising:
    executing a software component on a processing device;
    associating a binding library with the software component, the binding library comprising a loader component and a binding component, where:
        the loader component serves as an intermediary between the software component and the binding component; and
        the binding component comprises software component-side logic;
    utilizing the binding library to interface the software component with a remote server through communication across a network environment;
    providing a request to the loader component to update memory of the processing device with a new version of a library of the binding component;
    selecting, by the loader component, in response to the request, a desired version of the library where the desired version of the library is selected from at least two versions of the library associated with the binding component of the binding library; and
    loading the desired version of the library into memory of the processing device by:
        logically disconnecting from the remote server;
        unloading a previously loaded library;
        loading the desired version of the library; and
        reconnecting to the remote server.

2. The method of claim 1, wherein:
    providing the request to the loader component comprises:
        receiving instructions from the remote server computer to use a different library version; and
        communicating the request, by the software component, to the loader component, using an application programming interface call, where the binding component further comprises at least two library versions having logic for responding to the application programming interface call.

3. The method of claim 2 further comprising:
    configuring the at least one library version to have decision logic that responds to at least one, but not all, application programming interface calls, where a responsive application interface call includes at least one of a connect or disconnect call.

4. The method of claim 1, further comprising:
    receiving from the remote server, a new version of the library for use by the binding component;
    storing the new version of the library in an information source accessible by the binding library; and
    communicating by the loader component with the information source for selecting the desired library version.

5. The method of claim 1, wherein:
    providing a request to the loader component to update memory of the processing device with a new version of a library of the binding component comprises:
        accessing a library version variable that identifies the desired library version variable;
        comparing the library version variable with the version of the library loaded into memory; and
        providing the request if the library version variable is different from the version of the library loaded into memory; and
    loading the desired version of the library further comprises:
        accessing a shared library version table, when the library version variable is different from the version of the library loaded into memory, to access the desired library version.

6. The method of claim 1 further comprising:
    utilizing a program version table to store specific library versions for corresponding programs utilized by the software component;
    receiving an updated version of a library of the binding component; and
    storing the updated version in the program version table;
    wherein:
    selecting, by the loader component, in response to the request, a desired version of the library, further comprises selecting the desired version of the requested library based upon a value of a library version variable associated with the program version table.

7. The method of claim 1, wherein:
    the software component and remote server form part of an on-line transaction and processing system;
    further comprising:
    receiving from the remote server, a new version of the library for use by the binding component, where the software component, independently of the remote server, performs loading the desired version of the library into memory of the processing device, by performing the disconnecting, unloading, reloading and reconnecting in the specific order of:
        logically disconnecting from the remote server, then unloading a previously loaded library, then loading the desired version of the library, and then reconnecting to the remote server.

8. A computer program product stored on a memory that is executable by a processor to perform dynamic software version selection, comprising code for:
    executing a software component on a processing device;
    associating a binding library with the software component, the binding library comprising a loader component and a binding component, where:
        the loader component serves as an intermediary between the software component and the binding component; and
        the binding component comprises software component-side logic;
    utilizing the binding library to interface the software component with a remote server through communication across a network environment;
    providing a request to the loader component to update memory of the processing device with a new version of a library of the binding component;
    selecting, by the loader component, in response to the request, a desired version of the library where the desired version of the library is selected from at least two versions of the library associated with the binding component of the binding library; and
    loading the desired version of the library into memory of the processing device by:
        logically disconnecting from the remote server;
        unloading a previously loaded library;
        loading the desired version of the library; and
        reconnecting to the remote server.

9. The computer program product of claim 8, wherein:
the code for providing the request to the loader component comprises code for:
receiving instructions from the remote server computer to use a different library version; and
communicating the request, by the software component, to the loader component, using an application programming interface call, where the binding component further comprises at least two library versions having logic for responding to the application programming interface call.

10. The computer program product of claim 9 further comprising code for:
configuring the at least one library version to have decision logic that responds to at least one, but not all, application programming interface calls, where a responsive application interface call includes at least one of a connect or disconnect call.

11. The computer program product of claim 8, further comprising code for:
receiving from the remote server, a new version of the library for use by the binding component;
storing the new version of the library in an information source accessible by the binding library; and
communicating by the loader component with the information source for selecting the desired library version.

12. The computer program product of claim 8, wherein:
the code for providing a request to the loader component to update memory of the processing device with a new version of a library of the binding component comprises code for:
accessing a library version variable that identifies the desired library version variable;
comparing the library version variable with the version of the library loaded into memory; and
providing the request if the library version variable is different from the version of the library loaded into memory; and
loading the desired version of the library further comprises:
accessing a shared library version table, the library version variable is different from the version of the library loaded into memory, to access the desired library version.

13. The computer program product of claim 8 further comprising code for:
utilizing a program version table to store specific library versions for corresponding programs utilized by the software component;
receiving an updated version of a library of the binding component; and
storing the updated version in the program version table;
wherein:
the code for selecting, by the loader component, in response to the request, a desired version of the library, further comprises code for selecting the desired version of the requested library based upon a value of a library version variable associated with the program version table.

14. The computer program product of claim 8, wherein:
the code for the software component and remote server form part of an on-line transaction and processing system;
further comprising code for:
receiving from the remote server, a new version of the library for use by the binding component, where the software component, independently of the remote server, performs loading the desired version of the library into memory of the processing device, by performing the disconnecting, unloading, reloading and reconnecting in the specific order of:
logically disconnecting from the remote server, then unloading a previously loaded library, then loading the desired version of the library, and then reconnecting to the remote server.

15. A system that performs dynamic software version selection, comprising:
a processor coupled to memory, wherein the processor is performed by specific code in the memory to perform dynamic software version selection by:
executing a software component on a processing device;
associating a binding library with the software component, the binding library comprising a loader component and a binding component, where:
the loader component serves as an intermediary between the software component and the binding component; and
the binding component comprises software component-side logic;
utilizing the binding library to interface the software component with a remote server through communication across a network environment;
providing a request to the loader component to update memory of the processing device with a new version of a library of the binding component;
selecting, by the loader component, in response to the request, a desired version of the library where the desired version of the library is selected from at least two versions of the library associated with the binding component of the binding library; and
loading the desired version of the library into memory of the processing device by:
logically disconnecting from the remote server;
unloading a previously loaded library;
loading the desired version of the library; and
reconnecting to the remote server.

16. The system of claim 15, wherein the processor is further programmed for:
providing the request to the loader component by:
receiving instructions from the remote server computer to use a different library version; and
communicating the request, by the software component, to the loader component, using an application programming interface call, where the binding component further comprises at least two library versions having logic for responding to the application programming interface call.

17. The method of claim 16, wherein the processor is further programmed for:
configuring the at least one library version to have decision logic that responds to at least one, but not all, application programming interface calls, where a responsive application interface call includes at least one of a connect or disconnect call.

18. The method of claim 15, wherein the processor is further programmed for:
receiving from the remote server, a new version of the library for use by the binding component;
storing the new version of the library in an information source accessible by the binding library; and
communicating by the loader component with the information source for selecting the desired library version.

19. The method of claim 15, wherein the processor is further programmed for:

providing a request to the loader component to update memory of the processing device with a new version of a library of the binding component by:
- accessing a library version variable that identifies the desired library version variable;
- comparing the library version variable with the version of the library loaded into memory; and
- providing the request if the library version variable is different from the version of the library loaded into memory; and loading the desired version of the library further comprises:
- accessing a shared library version table, the library version variable is different from the version of the library loaded into memory, to access the desired library version.

20. The method of claim 15 wherein the processor is further programmed for:
- utilizing a program version table to store specific library versions for corresponding programs utilized by the software component;
- receiving an updated version of a library of the binding component; and
- storing the updated version in the program version table; wherein:
- selecting, by the loader component, in response to the request, a desired version of the library, further comprises selecting the desired version of the requested library based upon a value of a library version variable associated with the program version table.

\* \* \* \* \*